(12) United States Patent
Woolford et al.

(10) Patent No.: US 7,886,541 B2
(45) Date of Patent: Feb. 15, 2011

(54) WALL ELEMENTS FOR GAS TURBINE ENGINE COMBUSTORS

(75) Inventors: James R Woolford, Bristol (GB); Stephen J Mills, Ashbourne (GB); Kevin A White, Derby (GB)

(73) Assignee: Rolls-Royce plc, London (GB)

( * ) Notice: Subject to any disclaimer, the term of this patent is extended or adjusted under 35 U.S.C. 154(b) by 1066 days.

(21) Appl. No.: 11/653,407

(22) Filed: Jan. 16, 2007

(65) Prior Publication Data

US 2010/0251722 A1    Oct. 7, 2010

(30) Foreign Application Priority Data

Jan. 25, 2006  (GB) ................... 0601412.0
Jan. 25, 2006  (GB) ................... 0601438.5

(51) Int. Cl.
*F02C 1/00*    (2006.01)
*F02G 3/00*    (2006.01)

(52) U.S. Cl. .................... 60/755; 60/752; 60/758; 60/760

(58) Field of Classification Search ............. 60/752, 60/754, 755, 757, 758, 760
See application file for complete search history.

(56) References Cited

U.S. PATENT DOCUMENTS

| | | | |
|---|---|---|---|
| 4,050,241 A * | 9/1977 | DuBell ................ | 60/757 |
| 4,064,300 A | 12/1977 | Bhangu | |
| 4,184,326 A * | 1/1980 | Pane et al. ............ | 60/759 |
| 4,446,693 A | 5/1984 | Pidcock | |
| 6,408,628 B1 | 6/2002 | Pidcock | |
| 6,708,499 B2 * | 3/2004 | Pidcock et al. ......... | 60/796 |
| 2002/0066273 A1* | 6/2002 | Kitamura et al. ....... | 60/737 |
| 2003/0056516 A1 | 3/2003 | Hadder | |
| 2004/0083739 A1 | 5/2004 | Pidcock | |

FOREIGN PATENT DOCUMENTS

| | | |
|---|---|---|
| GB | 0 762 596 SP | 11/1956 |
| GB | 1 079 186 SP | 8/1967 |
| GB | 1197197 SP | 7/1970 |
| GB | 2 125 950 A | 3/1984 |
| GB | 2356042 A | 5/2001 |
| JP | 2003130354 AB | 5/2003 |

* cited by examiner

*Primary Examiner*—Michael Cuff
*Assistant Examiner*—Young Choi
(74) *Attorney, Agent, or Firm*—Jeffrey S. Melcher; Manelli Denison & Selter PLLC

(57) ABSTRACT

A combustor wall element arrangement for a gas turbine engine comprises an upstream wall element (50A) overlapping a downstream wall element (50B) and defining a gap (37) and an outlet (35) therebetween. In use, a coolant flow exits the outlet (35) to provide a coolant film (D) across at least a part of the downstream wall element (50B). The outlet (35) has a smaller dimension, normal to the downstream wall element (50B), than the gap (37) thereby increasing the velocity of the coolant flow across at the downstream wall element (50B). The resultant film coolant flow is effective further across the downstream wall element.

16 Claims, 5 Drawing Sheets

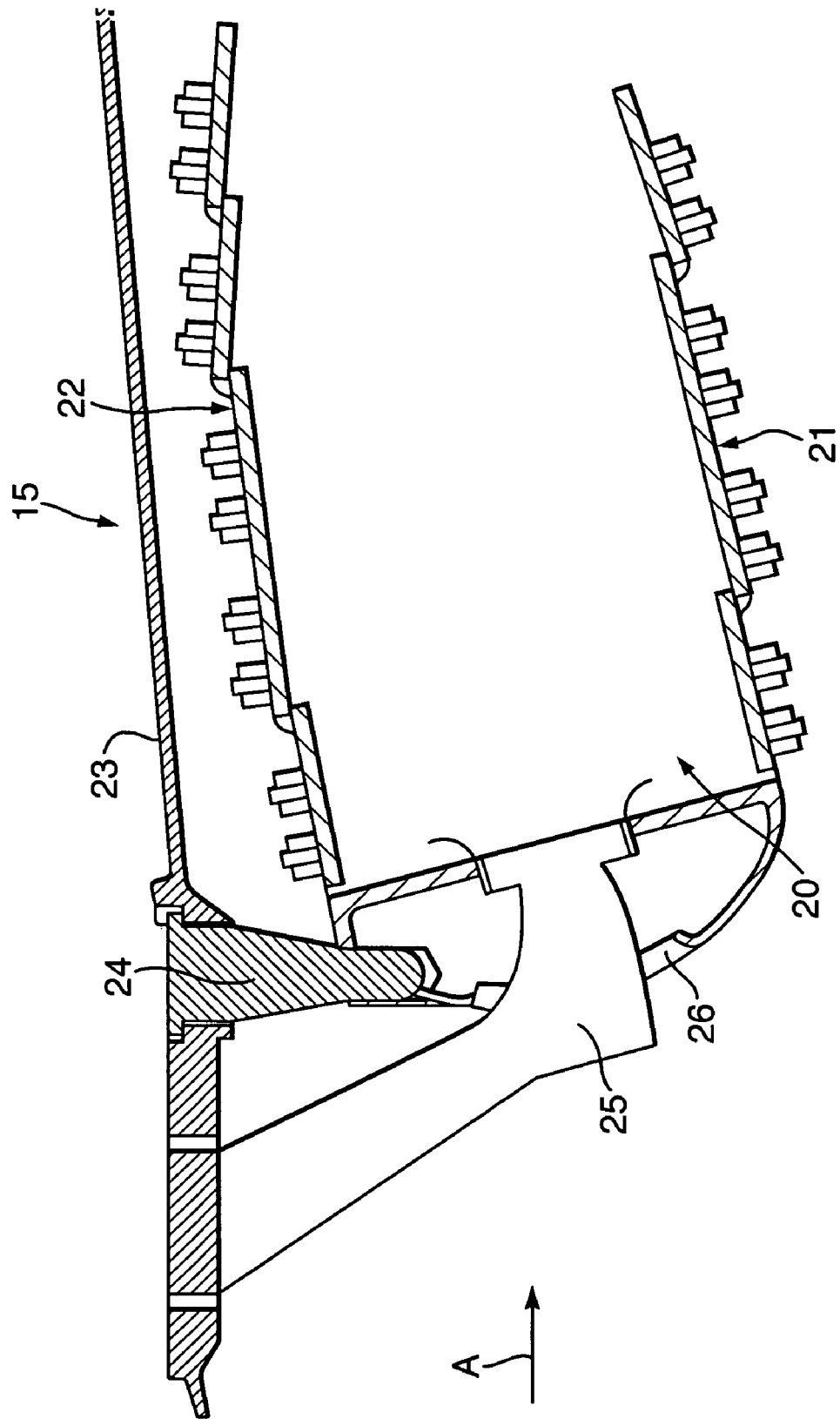

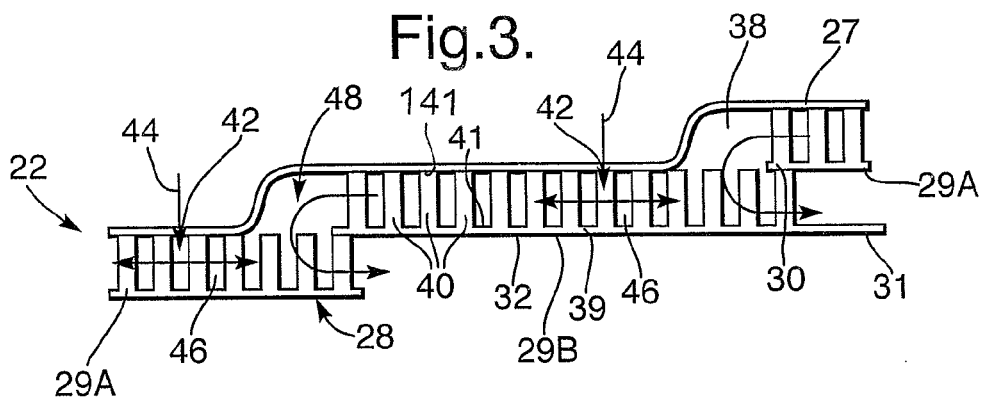
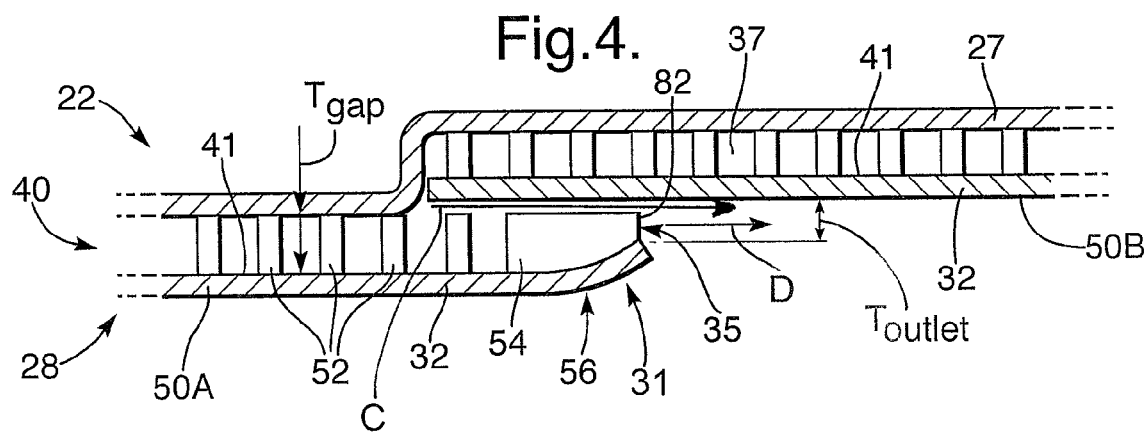

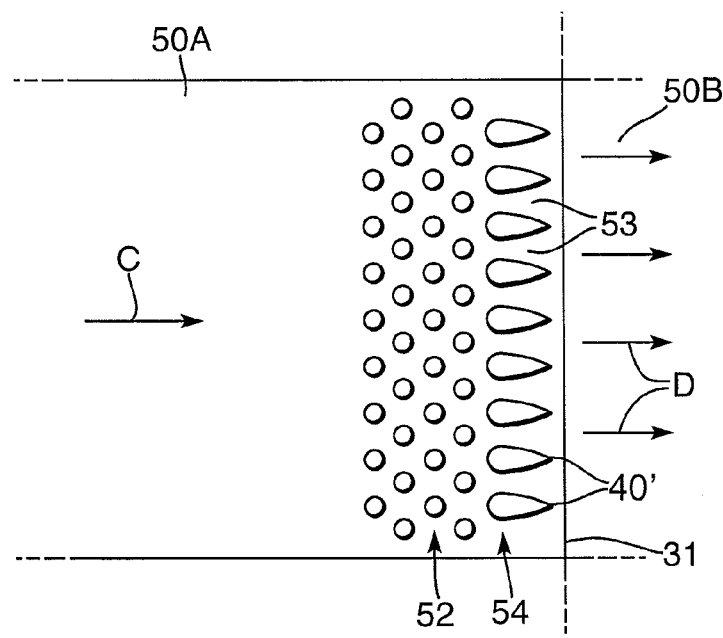
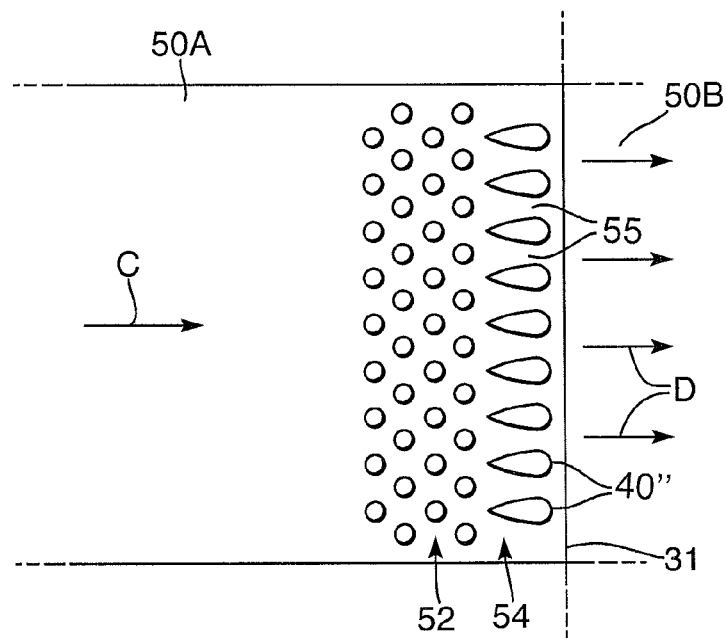
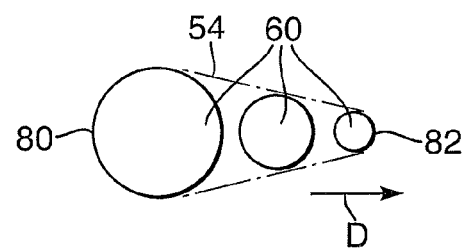

WALL ELEMENTS FOR GAS TURBINE ENGINE COMBUSTORS

CROSS-REFERENCE TO RELATED APPLICATIONS

This application which claims priority to GB 0601412.0, filed 25 Jan. 2006, and GB 0601438.5, filed 25 Jan. 2006.

BACKGROUND OF THE INVENTION

This invention relates to combustors for gas turbine engines, and in particular to wall elements for use in wall structures of combustors of gas turbine engines.

It is known to construct combustors of gas turbine engines with radially inner and outer double-walls, each having an external wall and an internal wall, the internal wall being formed of a plurality of tiles or other similar wall elements. Air is passed between the internal and external walls to provide cooling. Some of this air passes onto the hot side of the internal walls through effusion cooling holes to form a film of cooling air thereover.

The tiles typically overlap, often with a relatively cooler side of an upstream tile overlapping a hotter side of a downstream tile. This means that cooling air from the cooler side of the upstream tile can pass onto the hotter side of the downstream tile also to provide a cooling film.

Projections such as pedestals are generally provided on the rear of the tiles, extending toward the outer wall, to provide heat transfer. The pedestals are typically arranged in staggered rows to maximise heat transfer. Cooling of the tiles therefore takes place on the cooler side by convection from the projections and on the hotter side by film cooling.

Whereas these known tile configurations are sufficient to cool the tile, they use a significant amount of cooling airflow that could otherwise be used to improve propulsive efficiency of the engine. Furthermore, the pedestals cause turbulence in the cooling airflow exiting an upstream tile. This turbulence increases the amount of mixing of the film cooling air and the combustion products.

The object of the present invention is therefore to provide an improved cooling film across the surface of the downstream tile and thereby increasing the life of the tile.

SUMMARY OF THE INVENTION

According to the invention, there is provided a wall element arrangement for a gas turbine engine combustor, the arrangement comprising an upstream wall element overlapping a downstream wall element and defining a gap and an outlet therebetween; in use, a coolant exits the outlet to provide a coolant film across at least a part of the downstream wall element, characterized in that the outlet has a smaller dimension normal to the downstream wall element than the gap thereby increasing the velocity of the coolant flow across the downstream wall element.

Preferably, a plurality of projections is provided on an outer surface of the wall element to facilitate heat transfer to the coolant flow.

Preferably, the plurality of projections comprises a first pattern and a second pattern, the first pattern spaced from the outlet.

Preferably, the outlet has a smaller cross-sectional area than the gap.

Preferably, the upstream and downstream wall elements define a convergent portion leading to the outlet.

Preferably, the upstream and downstream wall elements define a constant cross-section portion of the outlet, the constant cross-section portion positioned downstream of the convergent portion.

Normally, the projections in the second pattern are adjacent the convergent portion and/or the constant cross-section portion.

Preferably, a trailing edge of the projections of the second pattern is aligned with the exit plane of the outlet, but the trailing edge may be within the region of the convergent portion and/or the constant cross-section portion.

Normally, the first pattern comprises a staggered array of pedestals.

Preferably, the second pattern comprises elongate pedestals.

Preferably, the elongate pedestals define coolant flow passages therebetween, the elongate pedestals are tapered in the downstream direction such that the coolant flow is diffused across the outlet.

Alternatively, the elongate pedestals are tapered in the upstream direction such that the passages are convergent laterally and towards the outlet to further increase the velocity of the coolant flow across the downstream wall element.

Alternatively, the second pattern comprises pedestals arranged substantially in-line. Adjacent pedestals consecutively increase or decrease in cross-sectional area.

BRIEF DESCRIPTION OF THE DRAWINGS

Embodiments of the invention will now be described by way of example only, with reference to the accompanying diagrammatic drawings, in which:—

FIG. 2 is a sectional side view of part of a combustor of the engine shown in FIG. 1.

FIG. 3 is a diagrammatic sectional side view of part of a double-wall structure of a combustor.

FIG. 4 is a diagrammatic sectional side view of part of a double-wall structure showing a first wall element according to the invention.

FIG. 5 is a diagrammatic sectional side view of part of a double-wall structure showing a second wall element according to the invention.

FIG. 6 is a diagrammatic plan view of part of an outer surface of either the first or second wall elements and shows s further embodiment of either.

FIG. 7 is a diagrammatic plan view of part of an outer surface of either the first or second wall elements and shows an alternative embodiment to FIG. 6.

FIG. 8 is a plan view of a plurality of projections in accordance with the present invention;

DETAILED DESCRIPTION OF THE INVENTION

Figure 1:
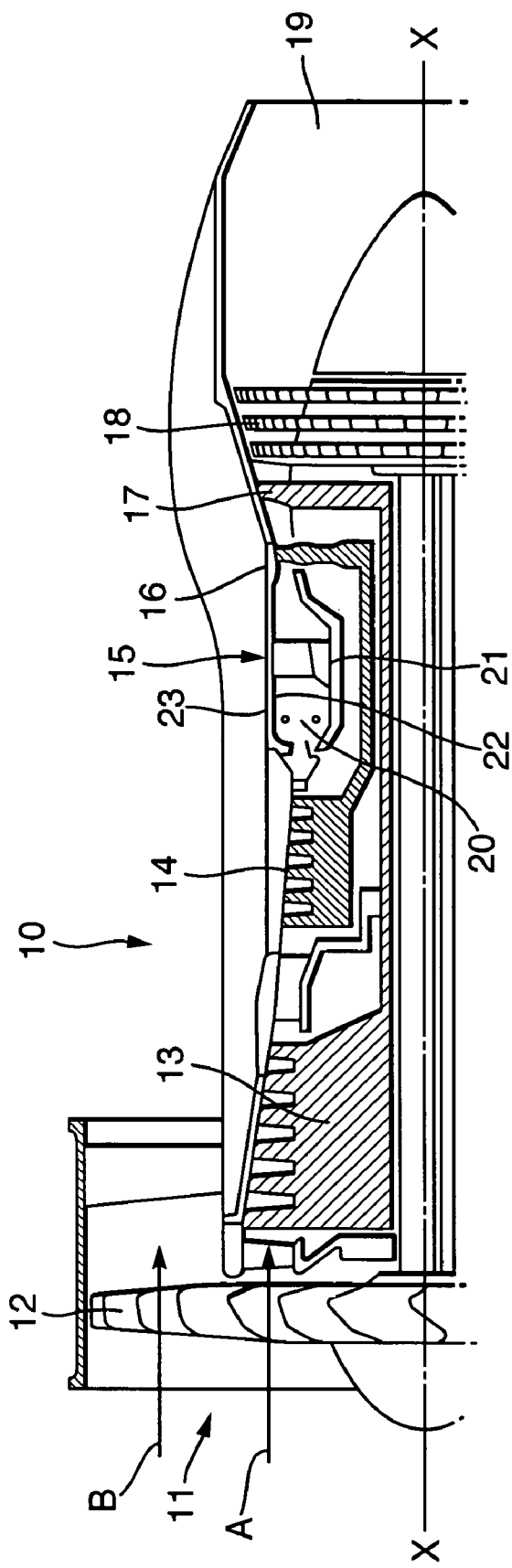
FIG. 1 is a sectional side view of a gas turbine engine.

With reference to FIG. 1, a gas turbine engine is generally indicated at 10 and comprises, in axial flow (arrow A) series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19. The engine has a rotational axis X-X.

The gas turbine engine 10 works in the conventional manner so that air entering the intake 11 is accelerated by the fan to produce two air flows: a first air flow A into the intermediate pressure compressor 13 and a second air flow B which provides propulsive thrust. The intermediate pressure compressor 13 compresses the airflow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive, the high, intermediate and low-pressure turbines 16, 17 and 18 before being exhausted through the nozzle 19 to provide additional propulsive thrust. The high, intermediate and low-pressure turbines 16, 17 and 18 respectively drive the high and intermediate pressure compressors 14 and 13 and the fan 12 by suitable interconnecting shafts.

Referring to FIG. 2, the combustor 15 is constituted by an annular combustion chamber 20 having radially inner and outer double-wall structures 21 and 22 respectively. The combustor 15 is secured to a wall 23 by a plurality of pins 24 (only one of which is shown). Fuel is directed into the chamber 20 through a number of fuel nozzles 25 located at the upstream end 26 of the chamber 20. The fuel nozzles are circumferentially spaced around the engine 10 and serve to spray fuel into air (flow A) derived from the high-pressure compressor 14. The resultant fuel/air mixture is then combusted within the chamber 20.

The combustion process, which takes place within the chamber 20, naturally generates a large amount of heat. It is necessary therefore to arrange the inner and outer wall structures 21 and 22 such that they are capable of withstanding the heat.

Referring now to FIG. 3, the radially inner and outer double-wall structures 21 and 22 each comprise an external wall in the form of a liner 27 and an internal wall 28. The terms 'internal' and 'external' are with respect to the combustion chamber 20. The internal wall 28 is made up of a plurality of discrete wall elements in the form of tiles 29A and 29B. Each of the tiles 29A, 29B has circumferentially extending edges 30 and 31, and the tiles are positioned adjacent each other, such that the edges 30 and 31 of adjacent tiles 29A, 29B overlap each other. Alternatively, the edges 30, 31 of adjacent tiles can abut each other.

Each tile 29A, 29B comprises a base portion 32 which is spaced from the liner 27 to define therebetween a space 38 for the flow of cooling fluid in the form of cooling air as will be explained below. Heat removal features, in the form of projections or pedestals 40, are provided on the base portion 32 and extend from the tile's cooler side, namely the tile's outer surface 141, into the space 38 towards the tile's inner surface 41. Conventional securing means (not shown) in the form of a plurality of threaded plugs extend from the base portions 32 of the tiles 29A, 29B through apertures in the outer wall 27. Nuts are screwed onto the plugs to secure the tiles 29A, 29B to the external wall 27.

Feed holes 42 are provided in the liner 27 to permit air from the high pressure compressor 14 to pass into the space 38 as illustrated by the arrows 44. Air entering the space will pass forwards and backwards (with respect to the main airflow A through the engine) as illustrated by the arrows 46. At the edges 30, 31 of the tiles 29A, 29B the air will pass over the inner surface 41 of an adjacent tile 29B. For forward flowing air 46, the path is simply over the inner hot surface 41, and under the outer cooler surface 141, of an adjacent downstream tile 29B which will be offset outwardly as illustrated in the figure. For backwards flowing cooling air, as illustrated by the arrows 48, the air will turn 180° to pass in a downstream direction with the air from the adjacent upstream tile 29A, 29B.

Whereas this prior art tile configuration is sufficient to cool the tiles 29A and 29B, it uses a significant amount of cooling airflow that could otherwise be used to improve propulsive efficiency of the engine. Furthermore, the pedestals cause turbulence in the cooling airflow exiting an upstream tile 29A. This turbulence increases the amount of mixing of the film cooling air and the hot combustion products and reduces the axial distance over which the cooling film is effective.

The object of the present invention is therefore to provide an improved cooling film across the surface of the downstream tile and thereby increasing the life of the tile. In particular, it is an objective to reduce the amount of turbulence in the airflow and increase the velocity of the cooling film.

Referring now to FIG. 4, a wall element arrangement 50A, 50B in accordance with the present invention is generally similar to and operates as the arrangement described with reference to FIG. 3 and therefore some of the same reference numerals are used. Briefly, the wall element arrangement 50A, 50B comprises an upstream wall element 50A overlapping a downstream wall element 50B. The wall elements define a gap 37 (38 in FIG. 3) between them and also between walls and the liner 27. Cooling air C enters the gap 37 (through feed holes not shown) before passing through an outlet 35, between wall elements 50A and 50B, to provide a coolant film D across at least a part of the downstream wall element 50B. In a prior art tile arrangement the outlet dimensions are generally the same as the flow area for the remainder of the wall element, however, the present invention is concerned with the outlet 35 having a smaller dimension normal to the downstream wall element 50B than the gap 37, viz $T_{outlet} < T_{gap}$ in FIG. 4. This reduces the thickness of the coolant film and increases the velocity of the coolant flow across at the downstream wall element 50B. Thus the coolant flow is effective further across the downstream wall element 50B.

In the FIG. 4 embodiment with $T_{outlet} < T_{gap}$ the outlet 35 has a smaller cross-sectional area than the gap 37. The downstream edge 31 of the tile 50A is curved towards the outer surface 39 of the tile 50B to define a convergent portion 56 of the outlet 35.

In FIG. 5 the outlet 35 further comprises a constant cross-section portion 58, defined between the wall elements 50A, 50B. The constant cross-section portion 58 is positioned downstream of the convergent portion 56 and allows the coolant air increased distance to form a reduced thickness film before exiting across the downstream tile 50B.

As in the prior art tile arrangement, the wall elements 50A, 50B each comprise a plurality of projections 40, generally cylindrical in shape, and extending from an outer surface 41 of each tile's base portion 32. The projections or pedestals facilitate heat transfer to the coolant flow as known in the art. The present invention is realized by an array of projections in a regular staggered pattern, however, in a preferred embodiment as shown in FIGS. 4, 6, 7, 9 and 10, a first pattern 52 is spaced from the downstream edge 31 of the tile 50A by the second pattern 54, which is adjacent to the edge 31. The first pattern 52 is a conventional staggered array of projections comprising rows of pedestals that are regularly spaced and pitched, each row evenly offset from the adjacent. This offset allows the coolant flow, passing around one row of projections, to impinge on the downstream and offset row of projections, maximizing heat transfer from the base portion 32 of the tile 50A (and 50B).

To further improve the stability and effectiveness of the coolant film, the second pattern 54 comprises elongate pedestals 40'. In FIG. 6, the elongate pedestals 40' define coolant flow passages 53 and at least some of the elongate pedestals 40' are tapered in the downstream direction such that the coolant flow is diffused across the outlet 35. In this FIG. 6 embodiment, providing additional and lateral diffusion of the coolant flow additionally smoothes the flow to reduce turbulence in the flow. This embodiment is also useful where the upstream part of the downstream tile 50B is known to get particularly hot. The stepped tile arrangement can cause combustion gases to be drawn around the downstream edge 31 and onto the downstream tile 50B.

FIG. 7 shows an alternative embodiment to FIG. 6, where the second pattern comprises elongate pedestals 40" being tapered in the upstream direction and define passages 55 which are laterally convergent towards the outlet 35 to further increase the velocity of the coolant flow across the downstream wall element 50B.

Figure 10:
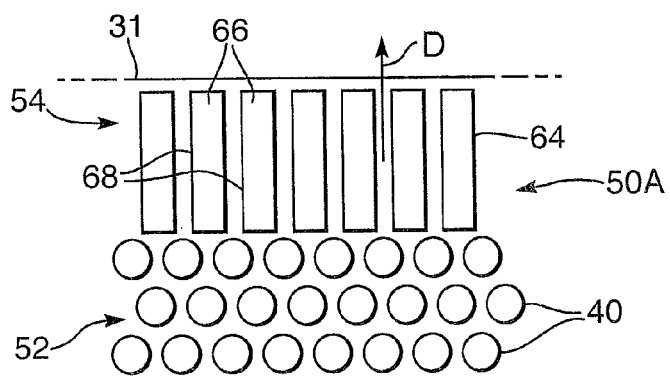
FIG. 10 is a similar view to FIG. 4 but of a fourth wall element according to the invention and FIG. 10A shows a preferred embodiment of the fourth wall element of FIG. 5.
Figure 10A:
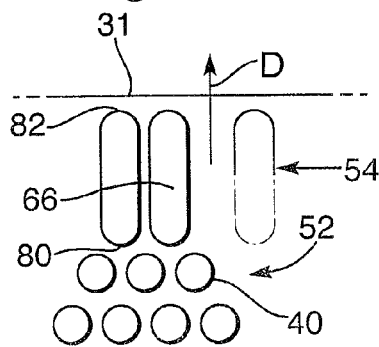

Although FIGS. 6 and 7 show preferred embodiments having diverging or converging passages (53, 55) defined by tapering pedestals (40', 40") the elongate pedestals of the second pattern 54 may be of a constant width as show in FIGS. 10 and 10A. However, these pedestals preferably comprise aerodynamic leading and trailing tips 80, 82 (FIGS. 5 and 10A) so that the cooling air is less disturbed on entry to and exit from the array of elongate pedestals of the second pattern 54. The leading and trailing tips 80, 82 are preferably circular in section, although other shapes are possible such as elliptical and pointed.

Although the pedestals of the second pattern 54 are preferably a single elongate shape, it is possible for these pedestals to be substituted by a plurality of discrete projections 60 as shown in FIG. 8. The plurality of pedestals 60 are aligned in close proximity to one another and preferably where a gap between pedestals is less than the corresponding width of the pedestal. This arrangement has the additional advantage of increasing the surface area for heat removal near to the edge 31 of the tile 50A. However, there may also be a slight increase in turbulence and thus it would be a matter of simple design choice and compromise between the less turbulent of coolant flow using the elongate projections of the second pattern 54 and greater heat removal using a plurality of aligned projections 60 for any given situation.

Figure 9:
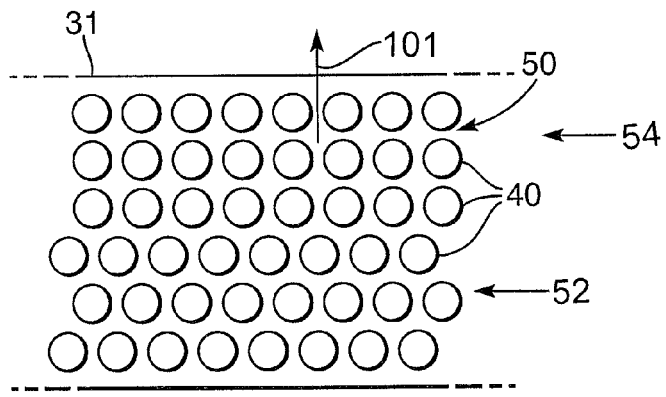
FIG. 9 is a diagrammatic plan view of the outer surface of a third wall element according to the invention.

FIG. 9 shows a third arrangement of pedestals extending from the base portion 32 of the tile 50A according to the invention. The tile 50A may be substituted in place of one or both tiles 29A, 29B in FIGS. 2 and 3. The pedestals 40 are arranged in first and second patterns 52, 54. The second pattern 54 comprises an array of substantially in-line pedestals 40 with respect to the cooling airflow direction arrow D. This second pattern 54 is adjacent, in this instance, a downstream edge 31 of the tile 50. Thus, air passing through the second pattern 54 of pedestals 40 moves in a generally straight line as illustrated by the arrow 101.

The first pattern 52 is spaced from the edge 31 by the second pattern 54, and comprises an array of staggered pedestals. Accordingly, for air to pass through the first pattern 52 it must follow a tortuous route where impingement on downstream pedestals is maximised and therefore is particularly effective in removing heat from the pedestals 40 and thus tile 50A.

The tile 50 has the second pattern 54 of pedestals 40 adjacent each edge 30, 31, with the first pattern 52 extending therebetween. This means that in use air will enter, for instance, through a feed hole 44 (see FIG. 3) into the first pattern 52 and then passes in both upstream and downstream directions. The staggered pattern 52 will provide for increased or maximum heat transfer. As the air approaches either of the edges 30, 31 it will pass into the pattern 54 and therefore moves in a substantially straight line that will help to smooth the air flow egressing and remove the turbulence from the air that would be caused by the prior art pedestal tiles.

A tile of the present invention therefore produces a film of cooling air to pass over an inner surface of the tile 50B that is less turbulent than the prior art tiles and which provides improved film cooling effectiveness. This improvement reduces the adiabitic wall temperature and reduces heat exchange between the cooling film and the tile surface, giving a reduction in tile temperature for a given cooling air flow. Alternatively, the same temperature may be maintained with reduced levels of cooling air.

Whereas FIG. 9 shows three rows of projections, aligned with one another, to direct the flow in a straight line, the present invention is realized by having at least two (rows of) projections aligned before the tile edge 31. It is anticipated that where particularly large tiles 50A, B are used up to ten rows of projections may be aligned. The number of aligned rows will depend on their effectiveness of straightening the flow and the thermal gradient throughout the host tile 50A and the temperature regime and length of the downstream tile 50B. It should be appreciated by the skilled artisan that the projections 40 need not be circular in cross section and instead could be elliptical, square or any other convenient cross-sectional shape.

Figure 9A:
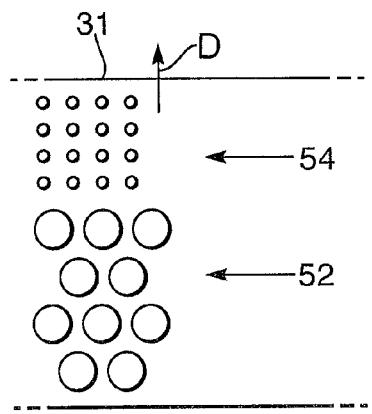
FIG. 9A is a diagrammatic plan view of part of the outer surface of the third wall element of FIG. 4 showing an enhanced embodiment.

FIG. 9A shows an embodiment similar to FIG. 9, however, in this case the second pedestal array 54 provides enhanced cooling to the downstream edge region 31 of the tile. Where the downstream edge 31 of the tile is sensitive to a reduced amount of cooling—by virtue of aligning the pedestals of the second pattern 54 in FIG. 9 to reduce turbulence, hence less cooling air impingement on the pedestals—additional pedestals are provided. Again in this case, the array of pedestals in the second pattern 54 comprise in-line rows of pedestals to ensure minimal turbulence, however, there are a greater number of pedestals. Preferably, where the number of pedestals is increased at least some pedestals comprise a smaller cross-sectional area. It is intended that the total surface area available for heat transfer in the second pattern 54 is about the same as in the first pattern 52 for a given surface area of tile. Thus, an even temperature across the tile and particularly at its downstream edge 31 is maintained.

The total number of pedestals in the array second pattern 54 may be increased by including further rows or columns or both as shown in FIG. 9A.

FIG. 10 shows a fourth embodiment of tile 50A according to the present invention. The tile 50A again has a first pattern 52 of pedestals 40 in a staggered array, arranged spaced from the edges 30, 31. In this instance the second pattern 54 is provided by a plurality of fins 66 which are elongate members defining straight parallel pathways 68 therebetween providing for air to flow in a straight line as illustrated by arrow D. The second pattern 54 is again provided adjacent each edge 30, 31.

FIG. 10A shows the fins 66 comprising more aerodynamic leading and trailing tips 80, 82 so that the cooling air is less disturbed on entry to and exit from the array of elongate pedestals. The leading and trailing tips 80, 82 are circular in section, although other shapes are possible such as elliptical and pointed.

There are thus described tiles and hence combustor wall structures which provide for more efficient cooling by having different air flow adjacent the edges of the tile relative to over the main body of the tile. The structure used to provide this effect is however of relatively simple construction and can thus be inexpensively and robustly manufactured by conventional techniques, such as casting.

Various modifications may be made without departing from the scope of the invention. For example, the projections on the outer surface of the tiles could have a wide range of patterns providing for different flow paths to maximise heat transfer on the inner and outer surfaces of the tile. Whilst FIG. 10 illustrates rectangular cross section fins, different shape fins could be provided to reduce the amount of turbulence in the air flow egressing the tile 50. The length of the fins 66 is dependent on the temperature gradients of both the host tile and the downstream tile. Generally, a longer fin 66 provides a less turbulent air flow, but then there is a greater area of the host tile 50 where there is a reduction in the amount of heat removal.

In FIG. 4 the elongate pedestal of the second pattern 54 is shown with its trailing edge 82 aligned with the exit plane of the outlet 35. This is preferred where the pedestals 40' are tapered towards the gap 35 or edge 31 and thus causes minimal turbulence in the cooling film over the downstream tile 50B. Where the pedestals are not tapered towards the gap 35 or edge 31 and have a bluff downstream end, it is preferable for the trailing edge 82 to be positioned upstream of the outlet 35 to enable the flow to smooth out before exiting the outlet. Whatever position the pedestals are arranged, it is preferable for their trailing edges 82 to be adjacent the convergent portion 56, i.e. within the region where the gap 37 narrows to the outlet. In this way, not only do the pedestals provide heat removal from the downstream edge 31, but also reduce the cross-sectional area of the outlet so to limit the convergence of the portion 56.

We claim:

1. A double wall combustor arrangement of a gas turbine engine, the arrangement comprising:
   an external wall comprising a liner;
   an internal wall comprising a plurality of overlapping tiles, the internal and external walls in respect to a combustion chamber of the gas turbine engine, an upstream tile overlapping a downstream tile and defining a gap and an outlet therebetween;
   a coolant flow passes during use through said gap and exits the outlet to provide a coolant film across at least a part of the downstream tile; and
   a plurality of projections being provided on an outer surface of the tiles to facilitate heat transfer to the coolant flow during use, wherein the outlet has a smaller dimension normal to the downstream tile than the gap to increase the velocity of the coolant flow across the downstream tile during use.

2. A double wall combustor arrangement according to claim 1, wherein the plurality of projections comprises a first pattern and a second pattern, the first pattern spaced from the outlet.

3. A double wall combustor arrangement according to claim 1, wherein the outlet has a smaller cross-sectional area than the gap.

4. A double wall combustor arrangement of a gas turbine engine, the arrangement comprising:
   an external wall comprising a liner;
   an internal wall comprising a plurality of overlapping tiles, the internal and external walls in respect to a combustion chamber of the gas turbine engine, an upstream tile overlapping a downstream tile and defining a gap and an outlet therebetween;
   a coolant flow passes during use through said gap and exits the outlet to provide a coolant film across at least a part of the downstream tile; and
   a plurality of projections being provided on an outer surface of the tiles to facilitate heat transfer to the coolant flow during use, wherein the outlet has a smaller dimension normal to the downstream tile than the gap to increase the velocity of the coolant flow across the downstream tile during use, and wherein the upstream and downstream tiles define a convergent portion leading to the outlet.

5. A double wall combustor arrangement according to claim 4, wherein the upstream and downstream tiles define a constant cross-section portion of the outlet, the constant cross-section portion positioned downstream of the convergent portion.

6. A double wall combustor arrangement according to claim 4, wherein the projections in the second pattern are adjacent the convergent portion and/or the constant cross-section portion.

7. A double wall combustor arrangement according to claim 6, wherein a trailing edge of the projections in the second pattern are within the region of the convergent portion and/or the constant cross-section portion.

8. A double wall combustor arrangement according to claim 6, wherein a trailing edge of the projections in the second pattern are within the region of the convergent portion and/or the constant cross-section portion.

9. A double wall combustor arrangement according to claim 6, wherein a trailing edge of the projections of the second pattern is aligned with the exit plane of the outlet.

10. A double wall combustor arrangement according to claim 2, wherein the first pattern comprises a staggered array of pedestals.

11. A double wall combustor arrangement according to claim 2, wherein the second pattern comprises elongate pedestals.

12. A double wall combustor arrangement according to claim 11, wherein the elongate pedestals define coolant flow passages therebetween, the elongate pedestals are tapered in the downstream direction such that the coolant flow is diffused across the outlet.

13. A double wall combustor arrangement according to claim 2, wherein the elongate pedestals define coolant flow passages therebetween, the elongate pedestals are tapered in the upstream direction such that the passages are convergent laterally and towards the outlet to further increase the velocity of the coolant flow across the downstream wall element.

14. A double wall combustor arrangement according to claim 2, wherein the second pattern comprises pedestals arranged substantially in-line.

15. A double wall combustor arrangement according to claim 14, wherein adjacent pedestals consecutively increase in cross-sectional area.

16. A double wall combustor arrangement according to claim 14, wherein adjacent pedestals consecutively decrease in cross-sectional area.

* * * * *